May 2, 1939.  C. A. BROWN ET AL  2,157,067
APPARATUS FOR DRAWING AND SEVERING GLASS RODS OR TUBING
Filed June 21, 1934  2 Sheets-Sheet 1
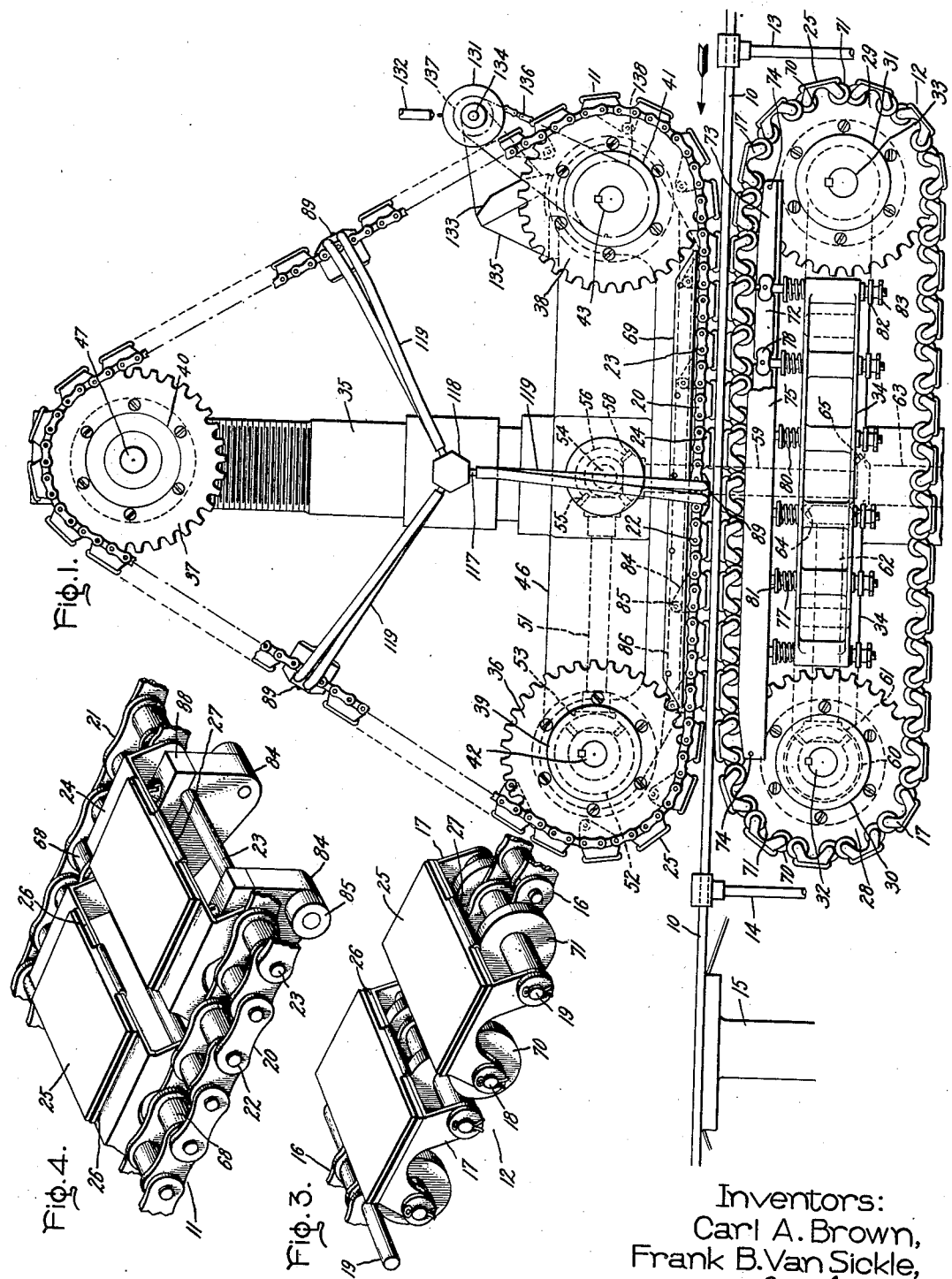
Inventors:
Carl A. Brown,
Frank B. Van Sickle,
by Harry E. Dunham
Their Attorney.

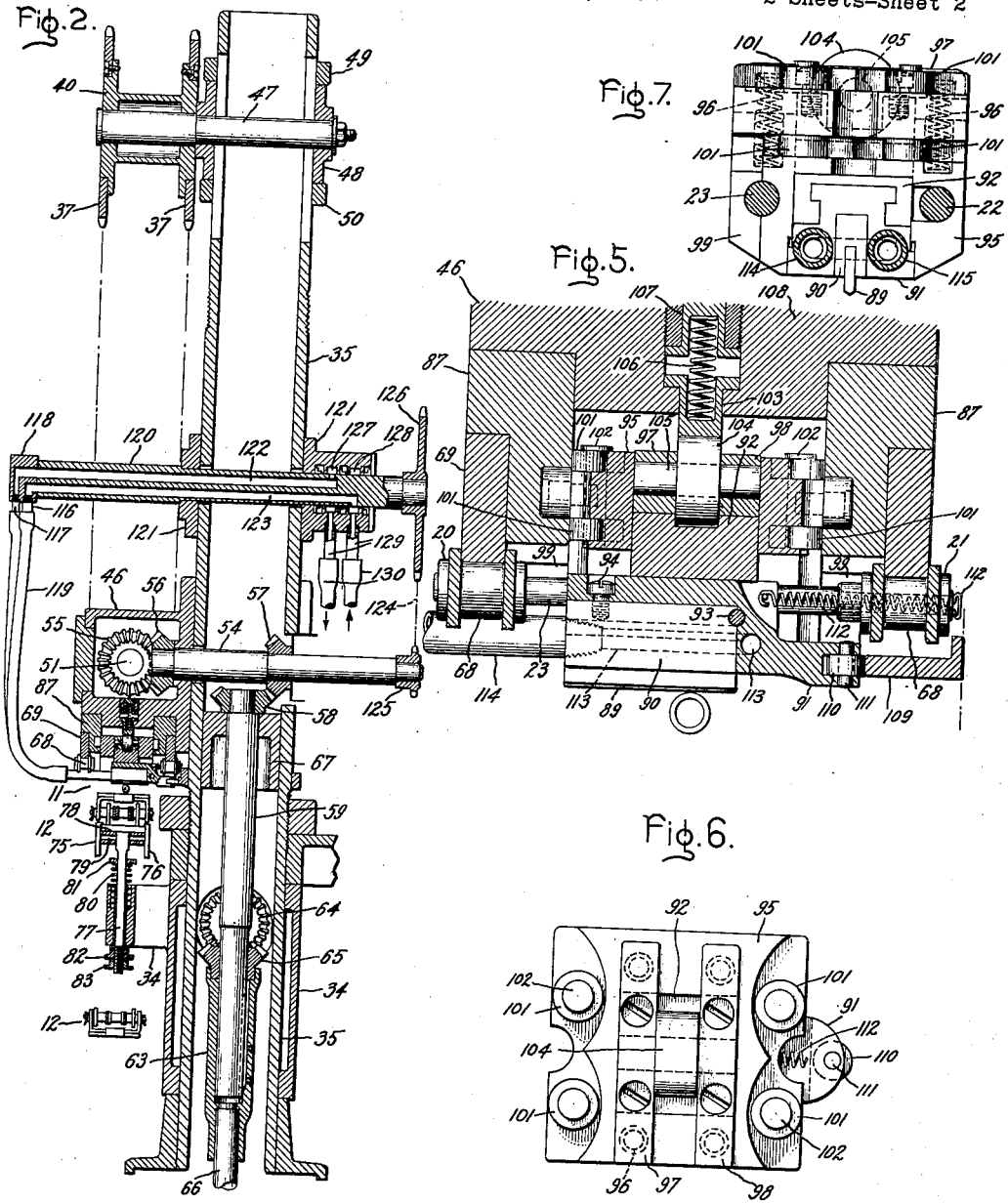

Patented May 2, 1939

2,157,067

UNITED STATES PATENT OFFICE 2,157,067

APPARATUS FOR DRAWING AND SEVERING GLASS RODS OR TUBING

Carl A. Brown, Chardon, and Frank B. Van Sickle, Lyndhurst, Ohio, assignors to General Electric Company, a corporation of New York Application June 21, 1934, Serial No. 731,662

13 Claims. (Cl. 49—48)

Our invention relates to apparatus for conveying and severing glass and more particularly to apparatus for pulling or drawing glass tube or rod from a forming machine, for instance of the type shown in Patent 1,218,598, issued March 6, 1917 to Danner, and for severing thereof. The tubing as it comes from the forming machine is still in a highly heated condition and may be easily distorted. One object of our invention is to provide a mechanism associated with the drawing or conveying means for severing the glass body passing therethrough. Another object of our invention is to provide means for causing rotation of the glass body passing through the drawing machine which tends to keep it straight. A salient feature of our machine is that it comprises a pair of driven endless belts which engage opposite sides of the tube and the directions of travel of which are at an angle to each other and to the longitudinal axis of the drawn body. Another feature is the knives which are incorporated in at least one of the belts and which engage the drawn body at regular intervals. Other features and advantages will appear from the drawings and description which follow of one species of our invention.

In the drawings, Fig. 1 is a side elevation of the tube or rod drawing machine of our invention; Fig. 2 is a vertical section through the center of said machine of Fig. 1; Figs. 3 and 4 are perspective views of portions of the lower and upper drawing belts or chains, respectively; Fig. 5 is a vertical section through the cutting head and associated parts during operation; and Figs. 6 and 7 are top and end views of said head.

The machine shown in the drawings is a specific application of our invention to be used for pulling glass tubing from a forming or drawing machine of the type disclosed in the Danner patent hereinbefore referred to and to the severing thereof. The glass tubing 10 passes between the upper and lower belts 11 and 12 and is pulled from right to left. The stationary rests 13, 14 and 15 afford additional support for the tubing. The lower belt 12, as shown in Figs. 1 and 3, is composed of a chain 16 and has shoes 17 carried on long pins 18 and 19. An elongated opening is provided in the shoe for pin 18 so that it does not interfere with the operation of the chain. The upper belt 11 as shown in Figs. 1 and 4 is composed of a pair of chains 20 and 21 located adjacent each other which are connected together by sets of long pins 22 and 23 on which the shoes 24 are mounted. To prevent the somewhat plastic glass tube 10 from being marked, pads 25, preferably of woven asbestos, are provided on the shoes of both the upper and lower chains being fastened thereto by the clips 26. The outer edges of the clips 26 are bent inwardly so as to grip the pad 25 and the tongues 27 thereof are bent down under the top of the shoe. The lower chain 16 is mounted on sprockets 28 and 29 on hubs 30 and 31, respectively, which are attached to shafts 32 and 33. These shafts turn freely in bracket 34 which supports all the additional mechanism associated with the lower belt and is clamped to the tubular standard 35 (Fig. 2) in the position desired. If it is desired to rotate the glass tubing 10 the bracket 34 is clamped to the standard in a position holding the belt at a slight angle to the tubing. The upper chains are mounted on pairs of sprockets 36, 37 and 38 mounted on hubs 39, 40 and 41, respectively. Hubs 39 and 41 are attached to shafts 42, 43, respectively, which are mounted in bracket 46 whereas hub 40 is mounted rotatably on pin 47 in bracket 48. Brackets 46 and 48 are each mounted on standard 35 and may be turned thereabout into the position required and clamped. Bracket 48 is clamped between the threaded collars 49 and 50 on the standard. Bracket 46 also provides support for other mechanism associated with the upper belt and when rotation of the tube 10 is desired, is clamped to the standard in a position to hold the belt at an angle equal to but opposite with reference to the tube to that of the lower belt.

Both the upper and lower belts are driven from the left sprockets 36 and 28, respectively, which are turned indirectly through mechanism within the standard 35. In the case of the upper belt, shaft 42 is turned by shaft 51 through bevel gears 52 and 53 meshing together and shaft 51 is driven by shaft 54 (Fig. 2) through gears 55 and 56. Shaft 54 passes through the standard and is driven by gear 57 meshing with gear 58 on the vertical shaft 59 within said standard. The lower belt is driven by shaft 32 through gears 60 and 61 from shaft 62 which is turned by the tubular shaft 63 located about shaft 59 through bevel gears 64 and 65. Tubular shaft 63 is keyed to shaft 59 and is turned by an external source of power (not shown) through shaft 66. A bearing is provided for shaft 59 by plug 67 located within the standard.

The glass tubing enters between the shoes of the upper and lower belts which have a definite horizontal path of travel and are caused to grip the tube by mechanism associated therewith. The path of travel is set by the upper belt, the rollers 68 of each chain 20 and 21 of which ride on the lower surface of cam 69 and the gripping action is caused by the upward pressure of the lower belt against the tube. The lower belt is forced upward by staggered rollers 70 and 71 on pins 18 and 19, respectively, of the chain 16 which engage the flexibly coupled sections 72 of a track located therebelow. End sections 73 of the track pivot on pins 74 extending between the guide rails 75 and 76 whereas all sections are forced upward by the thrust of rods 77 on blocks 78 pivoted in adjacent sections. The edges of the guide rails engage the sides of the wider spread rollers 70 of the belt and are provided with inwardly projecting edges which engage the track sections for support thereby keeping them in line. As shown particularly in Fig. 2, rods 77 are each fastened to a pin 79 in a block 78 and are forced upward by spring 80 which is confined between bracket 34 and the fixed collar 81 on said rod 77. The rod operates in a bushing in the bracket 34 and can move upward to the extent allowed by nut 82 and lock nut 83. The upper belt is also supported at intervals by arms 84 which engage through rollers 85 opposite ways 86 in plates 87 in bracket 46. The arms 84 are each clamped to pin 23 of the chain by a block 88 and engage pin 22 through a slot (not shown) therein.

The glass tubing 10 passing between the belts is engaged by knives located at intervals in the upper belt which either score or sever the tube. In this instance, there are three of the knives 89 equally spaced in the belt 11, as shown in Figs. 5, 6 and 7. The knives are permanently set in a block 90 and may be of metal such as the cemented tungsten carbide known as "Carboloy". As the section of the belt carrying the knife passes into contact with the tubing, the knife is in a raised position and does not contact the glass tube. The knife block 90 is mounted in slide 91, which rides in ways in slide block 92 and is retained in said slide by the pin 93 passing through the slide and by screw 94. In the raised position the slide block 92 lies in a similar position in the aperture in the carriage block 95 in which it is located. Four spring 96 which are located between and in apertures of the carriage block and the bearing caps 97 and 98, attached to said slide block cause said knife to take this position. The carriage block 95, as shown in Fig. 7, is mounted on pins 22 and 23 of the chain, the former resting in an aperture therein and the latter being clamped between said block and plate 99 attached by screws (not shown) thereto. The assembly is held in position by ends of the plate 99 extending beyond the block which engage the chains 20 and 21 and by upper and lower sets of rollers 101, four to a set, located on pins 102 in the carriage, and which engage plates 87. On advancing, the knife is brought into engagement with the glass tube by cam 103, located within an aperture of bracket 46, which engages roller 104 on pin 105 in bearing caps 97 and 98 and which forces the slide block down against the pressure of springs 96. The cam 103 is located below a plurality of springs 106 located at intervals therealong which are engaged by caps 107 located in the plug 108 filling the opening in bracket 46. Having made contact with the glass tube the knife is moved transversely so as to score it. This action is produced by cam 109 which is clamped to the standard 35 and which engages roller 110 in slide 91 causing it to move in its ways in slide block 92. The roller 110 is attached to the slide by means of pin 111 and is caused to follow the contour of the cam by spring 112 which is located between a pin in the slide and one end of a hollow chain pin through which it passes.

Since the tubing is at a high temperature and the knife is chilled and has its surface preferably wet, the glass tubing is cut completely through or scored so completely as to be easily broken apart on leaving the machine. A clean cut substantially at right angles to the tube results in either case. The knife is chilled by the circulation of a cooling medium, preferably water, through passage 113 in the slide 91 which is fed and emptied by pipes 114 and 115 screwed into said slide. The pipes are connected to similar pipes 116 and 117 in head 118 by means of flexible hose 119. The head 118 is mounted on the end of shaft 120 which is located in bracket 121 surrounding the standard 35 and distributes the cooling medium in passages 122 and 123 in said shaft to the specific pipes leading to the three knives. Shaft 120 is turned by a chain 124 extending between sprockets 125 and 126 in a shaft 54 and shaft 120, respectively, so the distributing pipes in the head 118 are always in line with the knives and the hose does not get entangled. Passages 122 and 123 in shaft 120 each connect to circular passage 127 and 128, respectively, in bracket 121 which are connected by means of pipes 129 and hose 130 to an external source and drainage for the cooling medium. The knife is wet by engagement with roll 131 (Fig. 1) which it engages during rotation of the chain. The roll is preferably of soft rubber and is wet by water falling from pipe 132. Since the knife normally lies in a drawn-in position, the cam 133 is provided for engaging roller 104 thereof and forcing said knife into engagement with the roll. The roll 131 is mounted on shaft 134 in bracket 135 which also supports cam 133 and is rotated so as to present a fresh surface to each of the knives by chain 136 which rides on sprockets 137 and 138 on shaft 134 and shaft 43. A breaker wheel such as disclosed by Danner in Patent 1,220,201 may also be provided to break and distribute the tubes if desired.

What we claim as new and desire to secure by Letters Patent of the United States is:

1. A machine for severing a glass body comprising an endless belt adapted to engage and move said glass body, a knife mounted on and movable with said belt and adapted to engage said glass body and means for moving the knife transversely to the path of travel of and across the surface of the body so that said body is scored.

2. A machine for severing a glass body comprising an endless belt adapted to engage and move said glass body, a carriage mounted on and movable with said belt and adapted to engage said glass body having ways therein transverse to the direction of movement of the belt, a knife mounted in said ways and a cam mounted adjacent the path of travel of the knife and adapted to engage said knife for moving the knife across the glass body to score it.

3. A machine for severing a heated glass body comprising an endless belt adapted to engage and move said glass body, a knife mounted on and movable with said belt and adapted to engage said body, means for moving said knife transversely to and across the surface of said body to score it and means for continuously circulating a cooling liquid around said knife to chill it.

4. A machine for severing a heated glass body comprising an endless belt adapted to engage and move said glass body, a carriage mounted on said belt having ways adapted to assume a position substantially perpendicular to the path of the glass body, a block mounted in said ways having ways therein transverse to the path of travel of the glass body, a knife mounted in the ways of said block, a cam mounted adjacent the path of travel of said carriage and adapted to be engaged by said block for moving the knife into engagement with the glass body, another cam mounted adjacent the path of travel of the block and adapted to be engaged by the knife for moving it transversely to the glass body and across the surface thereof so that the body is scored and at least partially severed.

5. A machine for severing a heated glass body comprising an endless belt adapted to engage and move said glass body, a knife mounted on and movable with said belt and adapted to engage said body, means for moving said knife transversely to and across the surface of said body to score it, means for wetting the surface of said knife comprising a wetted roller disposed adjacent to the path of said knife and means for moving said knife into engagement with said roller.

6. A machine for severing a heated glass body comprising an endless belt adapted to engage and move said glass body, a knife mounted on and movable with said belt and adapted to engage said body, means for moving said knife transversely to and across the surface of said body to score it, means for chilling said knife and means for also wetting the surface of said knife comprising a wetted roller disposed adjacent to the path of said knife and means for moving said knife into engagement with said roller.

7. A machine for severing a glass body comprising a pair of endless belts engaging opposite sides of the glass body and adapted to advance said body, a knife mounted on and movable with one of said belts and adapted to engage said body, means for moving said knife transversely to and across the surface of said body to score it, means for continuously circulating a cooling liquid around said knife to chill it and means for wetting the surface of said knife.

8. A machine for severing a heated glass body comprising an endless belt adapted to engage said glass body and move therewith, a carriage mounted on said belt and movable therewith, a knife movably mounted in said carriage, means for moving said knife perpendicularly to the path of the glass body and into engagement therewith, and means for moving said knife transversely to the glass body and across the surface thereof to score it.

9. A machine for pulling glass tubing comprising a pair of endless belts having the surfaces of longitudinally adjacent portions in parallel planes and adapted to engage opposite sides of said glass tubing, said belts being mounted so that the said longitudinally adjacent surfaces are at an angle to each other whereby the glass tubing is advanced and rotated by the movement of the belts, a knife mounted on and movable with one of said belts, and means for moving said knife to engage and score said glass tubing.

10. A machine for pulling glass tubing comprising a pair of endless belts having the surfaces of longitudinally adjacent portions in parallel planes and adapted to engage opposite sides of said glass tubing, said belts being mounted so that the said longitudinally adjacent surfaces are at an angle to each other whereby the glass tubing is advanced and rotated by the movement of the belts, a knife mounted on and movable with one of said belts, means for moving said knife to engage and score said glass tubing, and means for continuously circulating a cooling liquid around said knife to chill it.

11. A machine for pulling glass tubing comprising a pair of endless belts having the surfaces of longitudinally adjacent portions in parallel planes and adapted to engage opposite sides of said glass tubing, said belts being mounted so that the said longitudinally adjacent surfaces are at an angle to each other whereby the glass tubing is advanced and rotated by the moving of the belts, a knife mounted on and movable with one of said belts, means for moving said knife to engage and score said glass tubing, means for chilling said knife, and means for also wetting the surface of said knife.

12. A machine for severing glass tubing comprising an endless belt adapted to engage and move said tubing longitudinally, a carriage mounted on said belt, a block slidably mounted in said carriage so as to be movable perpendicularly toward and away from the path of said tubing, a knife slidably mounted in said block so as to be movable transversely of the path of said tubing, a cam mounted adjacent the path of travel of said carriage for engaging said block and moving the said knife into engagement with the tubing, and another cam mounted adjacent the path of travel of said block for engaging said knife and moving it transversely of the tubing across the surface thereof so that the said tubing is scored and at least partially severed.

13. A machine for pulling glass tubing comprising a vertically disposed column, upper and lower brackets mounted on said column, an endless belt mounted on each of said brackets so as to rotate in a substantially vertical plane, portions of said belts being longitudinally adjacent each other and adapted to engage opposite sides of the glass tubing, means for driving said belts to advance said tubing therebetween in a substantially horizontal plane, said brackets being relatively adjustable angularly on said column whereby the said belts thereon are adapted to be set at an angle to each other to cause said tubing to be rotated during its advancement therebetween, a knife mounted on one of said belts, and means for moving said knife transversely of the said glass tubing across the surface thereof so that said tubing is scored and at least partially severed.

CARL A. BROWN.
FRANK B. VAN SICKLE.